US012657974B2

(12) United States Patent
Fan et al.

(10) Patent No.: US 12,657,974 B2
(45) Date of Patent: Jun. 16, 2026

(54) INTELLIGENT DOOR LOCKS

(71) Applicant: Shenzhen Oceanwing Smart Innovations Technology Co., Ltd, Shenzhen (CN)

(72) Inventors: Tiedao Fan, Shenzhen (CN); Zhimin Jiao, Shenzhen (CN); Dongzhan Lu, Shenzhen (CN)

(73) Assignee: Shenzhen Oceanwing Smart Innovations Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/243,695

(22) Filed: Sep. 8, 2023

(65) Prior Publication Data

US 2024/0087384 A1 Mar. 14, 2024

(30) Foreign Application Priority Data

Sep. 9, 2022 (CN) .......................... 202211104738.3

(51) Int. Cl.
*G06V 40/12* (2022.01)
*G06V 40/10* (2022.01)
(Continued)

(52) U.S. Cl.
CPC .......... *G07C 9/00563* (2013.01); *G06V 40/11* (2022.01); *G06V 40/12* (2022.01); *G06V 40/1347* (2022.01); *G07C 9/257* (2020.01)

(58) Field of Classification Search
CPC . H04W 12/0471; H04W 12/06; H04W 12/68; H04W 4/38; H04W 4/80;
(Continued)

(56) References Cited

U.S. PATENT DOCUMENTS 5,594,806 A * 1/1997 Colbert .................. G06V 40/11
382/116
2016/0318480 A1* 11/2016 Menard .............. G07C 9/00309
(Continued)

FOREIGN PATENT DOCUMENTS

CN 205140036 U 4/2016
CN 108091015 A 5/2018
(Continued)

OTHER PUBLICATIONS

Jan. 21, 2025—(CN) Office Action of Application 202211104738.3.
(Continued)

*Primary Examiner* — Dionne Pendleton
(74) *Attorney, Agent, or Firm* — Banner & Witcoff, Ltd.

(57) ABSTRACT

The present invention relates to a control method, device, and storage medium for an intelligent door lock. The method comprises: detecting, by a computing device, a target signal associated with an unlocking object; parsing the identification information of the unlocking object from the target signal; based on determining that the identification information is the target identification information, obtaining a first image of the unlocking object; determining whether the unlocking object is a target object based on the first image; and based on determining that the unlocking object is determined to be the target object and detection of an unlocking action, controlling the intelligent door lock to unlock.

17 Claims, 6 Drawing Sheets

(51) Int. Cl.
*G07C 9/00* (2020.01)
*G07C 9/25* (2020.01)

(58) Field of Classification Search
CPC ............. H04W 12/068; H04W 12/084; H04W
12/088; H04W 12/63; H04W 12/71;
H04W 12/79; H04W 36/34; H04W 4/023;
H04W 4/029; H04W 4/12; H04W 4/14;
H04W 4/21; H04W 4/44; H04W 4/46;
H04W 4/60; H04W 4/70; H04W 48/04;
H04W 76/11; H04W 84/005; H04W
84/12; H04W 88/08; H04W 12/65; H04W
4/027; H04W 4/33; H04W 12/0431;
H04W 84/18; H04W 4/40; H04W 88/02;
G07C 2009/0019; G07C 2009/0023;
G07C 2209/63; G07C 9/00182; G07C
9/00563; G07C 9/257; G07C 9/27; G07C
9/00309; G07C 9/00571; G07C 9/26;
G07C 9/00896; G07C 2009/00769; G07C
2009/00396; G07C 2009/00404; G07C
2009/00642; G07C 2009/00936; G07C
9/00666; G07C 9/00674; G07C 9/00912;
G07C 9/20; G07C 9/21; G07C 9/00904;
G07C 9/00944; G07C 2009/00793; G07C
2209/62; G07C 9/00857; G07C
2009/00507; G07C 2009/00634; G07C
9/00; G07C 9/32; G07C 9/22; G07C
2209/08; G07C 2009/00277; G07C
2009/00373; G07C 2009/00412; G07C
9/00174; G07C 9/29; G07C 2009/00626;
G07C 2009/00785; G07C 2009/00841;
G07C 2009/00865; G07C 2009/00928;
G07C 9/215; G07C 9/23; G07C 9/25;
H04L 9/0822; H04L 67/12; H04L
2209/56; H04L 2209/805; H04L 2209/84;
H04L 51/02; H04L 51/04; H04L 51/046;
H04L 63/08; H04L 67/025; H04L 67/10;
H04L 9/0869; H04L 9/0894; H04L 9/14;
H04L 9/3228; H04L 9/3247; G06F 18/22;
G06F 21/32; G06F 1/263; G06F 1/266;
G06F 16/25; G06F 16/583; G06F 16/951;
G06F 18/23; G06F 21/00; G06F 21/31;
G06F 21/316; G06F 3/017; G06F 3/0488;
G06F 3/0487; G06F 8/65; G06V 10/141;
G06V 10/462; G06V 10/751; G06V
10/761; G06V 40/13; G06V 40/16; G06V
40/172; G06V 40/40; G06V 40/45; G06V
20/59; G06V 40/15; G06V 40/166; G06V
40/168; G06V 40/28; G06V 40/11; G06V
40/12; G06V 40/1347; B60R 25/1004;
B60R 25/00; B60R 25/045; B60R 25/24;
B60R 25/31; B60R 25/32; B60R 25/04;
B60R 25/406; G06Q 30/0645; G06Q
10/00; G06Q 10/02; G06Q 10/20; G06Q
20/0855; G06Q 20/127; G06Q 20/14;
G06Q 20/145; G06Q 20/18; G06Q
20/202; G06Q 20/308; G06Q 20/3278;
G06Q 20/34; G06Q 20/3823; G06Q
20/4014; G06Q 20/4015; G06Q 20/4016;
G06Q 20/405; G06Q 30/00; G06Q
30/012; G06Q 30/0265; G06Q 30/0633;
G06Q 30/0639; G06Q 50/06; G06Q
50/40; G06Q 10/0833; G06Q 10/0836;
G06Q 20/2295; G06Q 20/341; G06Q
20/4093; B60Q 1/52; E05B 17/22; E05B
19/0005; E05B 39/04; E05B 65/48; E05B
67/00; E05B 2047/0095; E05B
2047/0048; E05B 2047/0072; E05B
2047/002; E05B 2047/0058; E05B
47/0012; E05B 47/00; E05B 2047/0091;
E05B 2047/0022; E05B 45/06; E05B
47/026; E05B 2047/0097; E05B 47/0001;
E05B 2047/0016; E05B 2047/0068; E05B
2047/0069; E05B 2047/0071; E05B
39/00; E05B 41/00; E05B 53/008; E05B
65/06; E05B 2045/069; E05B 55/12;
E05B 2047/0067; E05B 81/54; E05B
63/0004; E05B 19/22; E05B 2047/0053;
G01C 21/26; G01S 19/45; G01S 5/0264;
G01S 5/0284; G01S 5/18; G01S 13/56;
G01S 13/867; G01S 19/24; G05D
23/1917; G05D 1/0022; G05D 1/0212;
G05D 1/027; G06K 19/0723; G06K
7/1417; G06K 7/1452; G06N 20/00;
G07F 13/025; G07F 15/005; G07F 17/12;
G07F 7/1008; G08B 13/08; G08B
13/189; G08B 13/19647; G08B 13/19656;
G08B 21/0266; G08B 21/06; G08B
25/008; G08B 25/016; G08B 29/188;
G08B 13/1966; G08B 13/19636; G08B
13/19695; G08B 29/185; G08B 6/00;
G08G 1/096725; G08G 1/096741; G08G
1/096775; G08G 1/168; G16Y 10/35;
G16Y 10/40; Y02T 90/12; H04N
21/41422; H04N 7/181; H04N 7/186;
H04M 1/673; H04M 1/724; H04M
2250/52; H04B 1/3833; Y02D 30/70;
G08C 23/02; E05C 1/004; Y10T
292/1021; B60W 30/06; B60W 2400/00;
B62D 15/0285; B62D 1/00; G07B 15/00;
B62H 5/00; B62H 5/20
See application file for complete search history.

(56) References Cited

U.S. PATENT DOCUMENTS

| | | | | |
|---|---|---|---|---|
| 2017/0171178 A1* | 6/2017 | Reynders | ............. | G06Q 20/145 |
| 2018/0290627 A1* | 10/2018 | Hariri | ................... | B60R 25/245 |
| 2021/0216800 A1* | 7/2021 | Lin | ......................... | G06V 40/13 |
| 2022/0051496 A1* | 2/2022 | Einberg | ................... | G07C 9/27 |
| 2022/0194386 A1* | 6/2022 | Sato | ....................... | G06V 40/28 |

FOREIGN PATENT DOCUMENTS

| | | |
|---|---|---|
| CN | 108520575 A | 9/2018 |
| CN | 207867580 U | 9/2018 |
| CN | 112950819 A | 6/2021 |
| CN | 216352486 U | 4/2022 |

OTHER PUBLICATIONS

Mar. 28, 2025 (CN) Rejection Decision of Application 202211104738. 3.
Oct. 22, 2024 (CN) CN Office Action of CN 2022111047383.

* cited by examiner

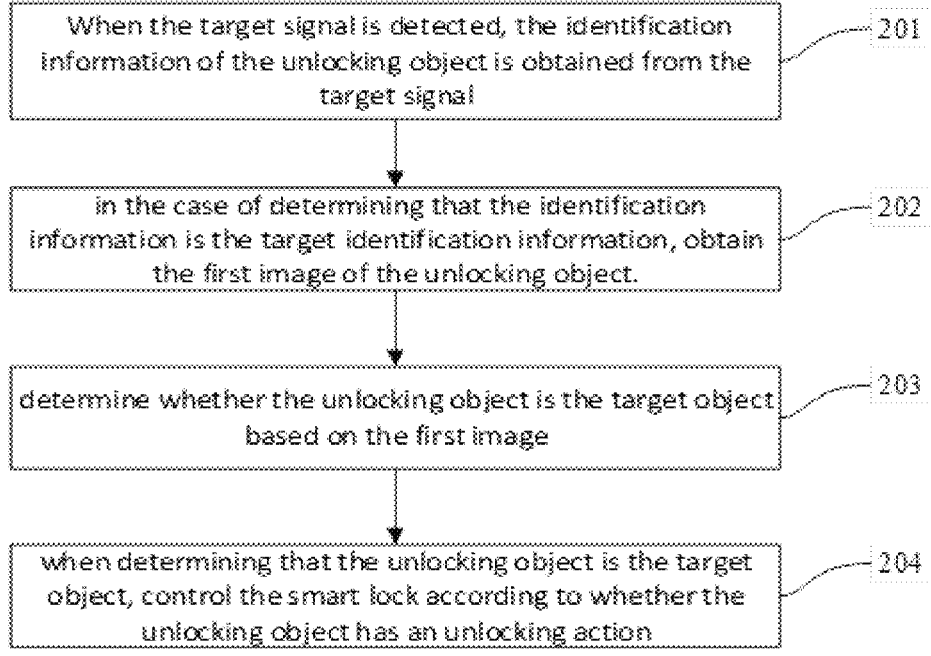

When the target signal is detected, the identification information of the unlocking object is obtained from the target signal — 201 in the case of determining that the identification information is the target identification information, obtain the first image of the unlocking object. — 202 determine whether the unlocking object is the target object based on the first image — 203 when determining that the unlocking object is the target object, control the smart lock according to whether the unlocking object has an unlocking action — 204

FIG. 2

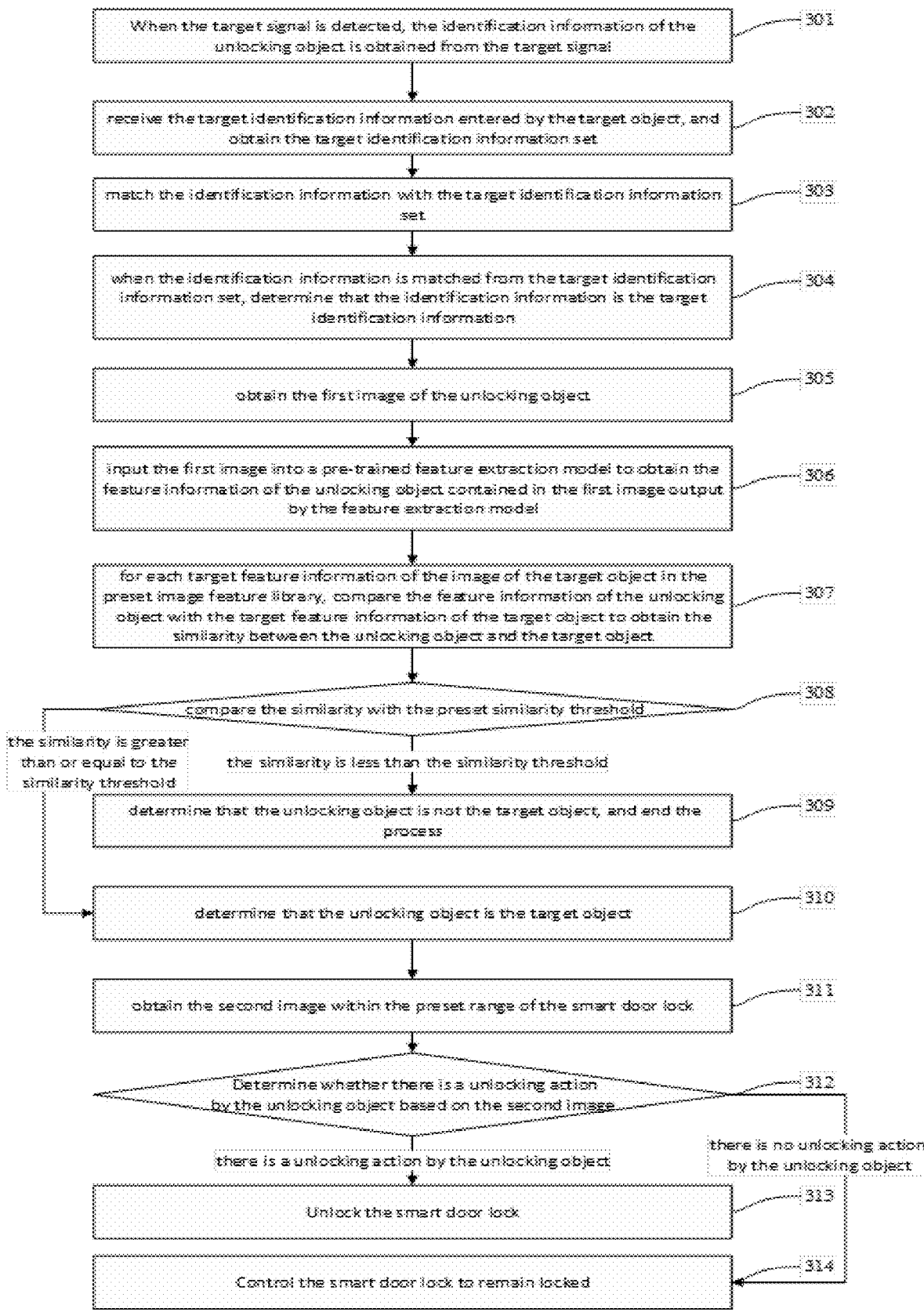

When the target signal is detected, the identification information of the unlocking object is obtained from the target signal — 301 receive the target identification information entered by the target object, and obtain the target identification information set — 302 match the identification information with the target identification information set — 303 when the identification information is matched from the target identification information set, determine that the identification information is the target identification information — 304 obtain the first image of the unlocking object — 305 input the first image into a pre-trained feature extraction model to obtain the feature information of the unlocking object contained in the first image output by the feature extraction model — 306 for each target feature information of the image of the target object in the preset image feature library, compare the feature information of the unlocking object with the target feature information of the target object to obtain the similarity between the unlocking object and the target object — 307 compare the similarity with the preset similarity threshold — 308 the similarity is greater than or equal to the similarity threshold the similarity is less than the similarity threshold determine that the unlocking object is not the target object, and end the process — 309 determine that the unlocking object is the target object — 310 obtain the second image within the preset range of the smart door lock — 311

Determine whether there is a unlocking action by the unlocking object based on the second image — 312 there is a unlocking action by the unlocking object there is no unlocking action by the unlocking object Unlock the smart door lock — 313

Control the smart door lock to remain locked — 314

FIG. 3

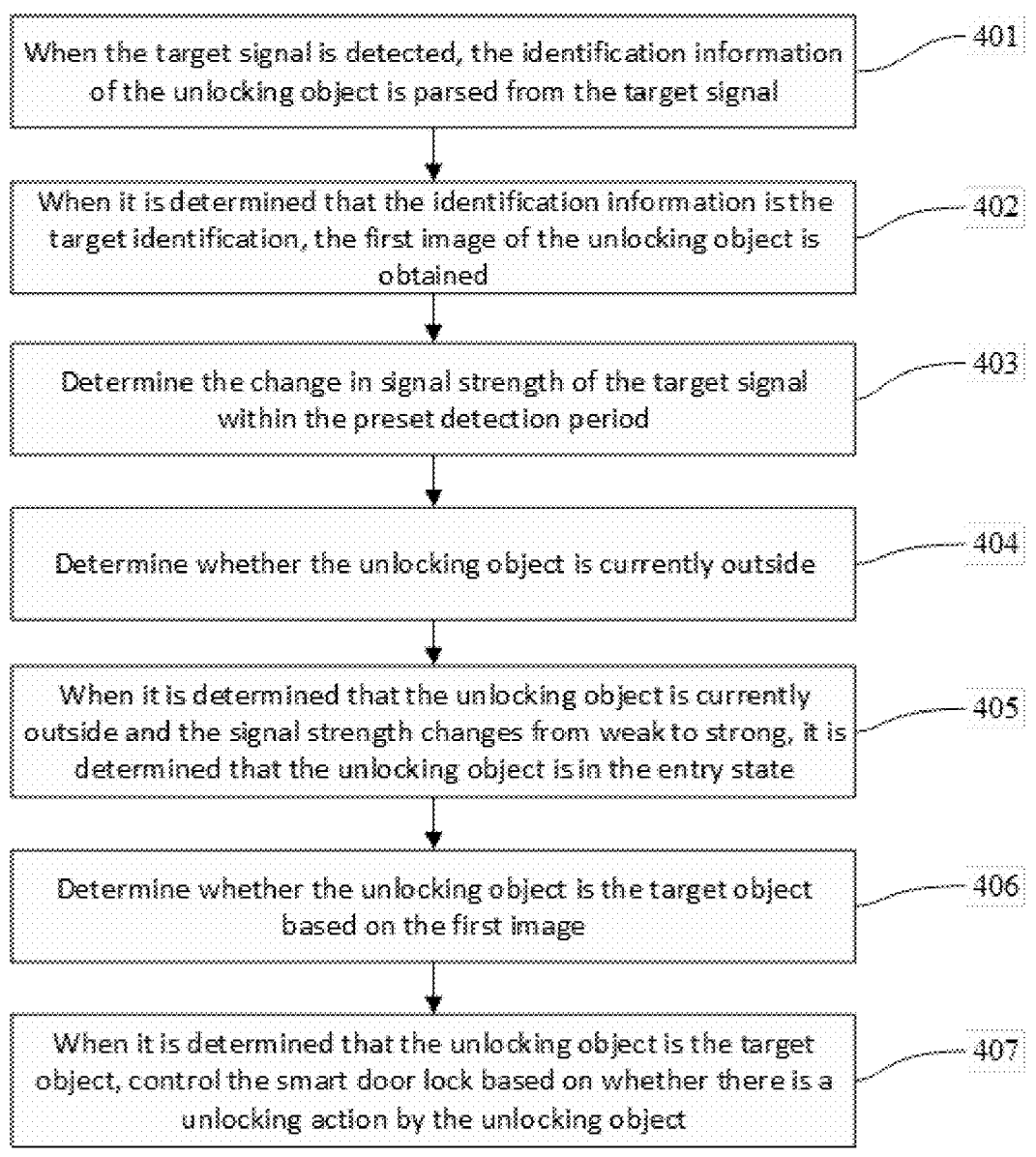

When the target signal is detected, the identification information of the unlocking object is parsed from the target signal — 401

When it is determined that the identification information is the target identification, the first image of the unlocking object is obtained — 402

Determine the change in signal strength of the target signal within the preset detection period — 403

Determine whether the unlocking object is currently outside — 404

When it is determined that the unlocking object is currently outside and the signal strength changes from weak to strong, it is determined that the unlocking object is in the entry state — 405

Determine whether the unlocking object is the target object based on the first image — 406

When it is determined that the unlocking object is the target object, control the smart door lock based on whether there is a unlocking action by the unlocking object — 407

FIG. 4

INTELLIGENT DOOR LOCKS

CROSS-REFERENCE TO RELATED APPLICATION

This application claims priority to CN 202211104738.3, filed with the China National Intellectual Property Administration on Sep. 9, 2022, which is incorporated by reference in its entirety.

BACKGROUND

A smart lock is an improved lock based on traditional mechanical locks, which is more intelligent and convenient in terms of user security, recognition, and management. Currently, face recognition, fingerprint recognition, or iris recognition are used as the main unlocking methods for user identity verification, and then unlocking is achieved. Among them, when users use the above unlocking methods, they need to actively cooperate with the door lock for identity verification, which increases the time for users to unlock and makes the operation process cumbersome, resulting in a potentially poor user experience.

SUMMARY

The present application describes a control method and device, and storage medium for smart locks, which can reduce the time for users to unlock and simplify the operation process.

The present application provides a control method for a smart lock, the method comprising: detecting, by a computing device, a target signal associated with an unlocking object; parsing identification information of the unlocking object from the target signal; based on determining that the identification information is target identification information, obtaining a first image of the unlocking object; determining whether the unlocking object is a target object based on the first image; and based on determining that the unlocking object is the target object and detection of an unlocking action, controlling the intelligent door lock to unlock.

In a possible implementation, the method further comprises: receiving the target identification information provided by the target object, obtaining a set of target identification information; matching the identification information with the set of target identification information; and based on that the identification information is matched with the set of target identification information, determining the identification information as the target identification information.

In a possible implementation, determining whether the unlocking object is the target object based on the first image comprises:

inputting the first image into a pre-trained feature extraction model to obtain feature information of the unlocking object;

comparing the feature information of the unlocking object with target feature information of the target object to obtain a similarity between the unlocking object and the target object; and determining whether the unlocking object is the target object based on the similarity.

In a possible implementation, determining whether the unlocking object is the target object based on the similarity comprises:

comparing the similarity with a preset similarity threshold;

based on a determination that the similarity is greater than or equal to the preset similarity threshold, determining the unlocking object as the target object; and based on a determination that the similarity is less than the preset similarity threshold, determining the unlocking object as a non-target object. In a possible implementation, controlling the smart lock comprises:

obtaining a second image within a preset range of the intelligent door lock;

determining whether the unlocking object has an unlocking action based on the second image; and based on a determination that the unlocking object has an unlocking action, controlling the intelligent door lock to unlock.

In a possible implementation, determining whether the unlocking action of the unlocking object exists based on the second image comprises:

inputting the second image into a pre-trained image recognition model to obtain a recognition result; and based on that the recognition result indicates that the unlocking object exists in the second image, determining that the unlocking object has the unlocking action. In a possible implementation, the method further comprises:

determining a change in signal strength of the target signal within a preset detection period;

determining whether the unlocking object is currently outside of the intelligent door lock; and based on a determination that the unlocking object is currently outside of the intelligent door lock and an increase in the signal strength, determining that the unlocking object is in an entering state.

The present application provide a control device configured to perform the method(s) described herein.

Additionally, the present application provides an intelligent door lock, including a processor and a memory, wherein the processor is used to execute the control program of the intelligent door lock stored in the memory to implement any of the control methods of the intelligent door lock described herein.

Additionally, the present application provides a non-transitory computer-readable storage medium, which stores one or more programs that can be executed by one or more processors to implement any of the control methods of the intelligent door lock described herein.

The technical solution provided by the present application can improve the security of unlocking by verifying the identification information, the first image, and the unlocking action of the unlocking object, and can avoid danger when the electronic device is taken by others. After the unlocking object is verified through identification information, the first image, and the unlocking action, the intelligent door lock can be unlocked, realizing a seamless identity verification without the need for the unlocking object to actively cooperate with the intelligent door lock for identity verification, simplifying the unlocking operation and improving the user experience.

BRIEF DESCRIPTION OF THE DRAWINGS

FIG. 2 shows a flowchart of an exemplary implementation of an intelligent door lock control method;

FIG. 3 shows a flowchart of an exemplary implementation of an intelligent door lock control method;

FIG. 4 shows a flowchart of an exemplary implementation of an intelligent door lock control method;

DETAILED DESCRIPTION

In order to make the purpose, technical solution, and advantages of the embodiments of the present application clearer, the technical solution of the present application will be described clearly and completely below in conjunction with the drawings. The described examples are part of the examples of the present application, not all examples. Based on the examples of the present invention, all other examples obtained by those skilled in the art without creative labor are within the scope of the present application.

To facilitate understanding of the present application, the application will be described with reference to the drawings.

Figure 1:
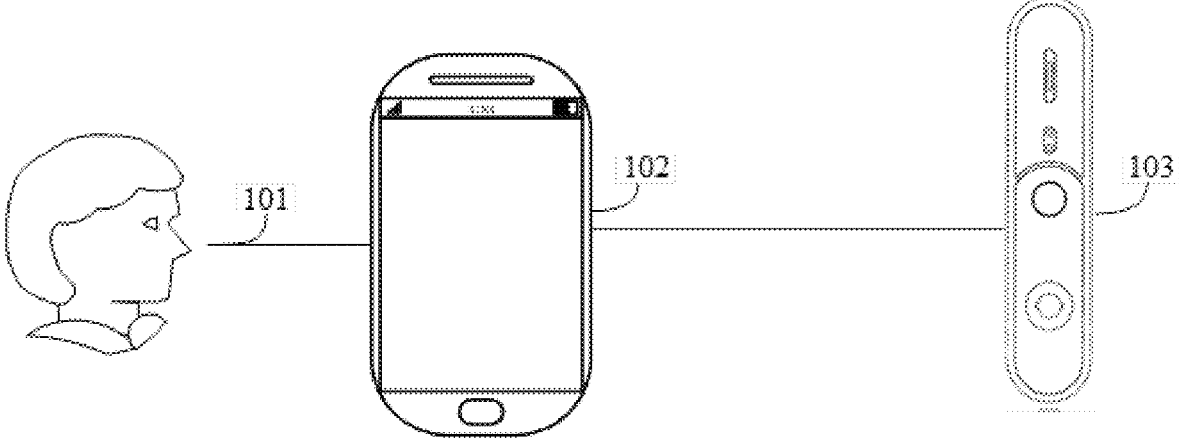
FIG. 1 shows a schematic diagram of an application scenario.

FIG. 1 shows a schematic diagram of an application scenario of. The application scenario shown in FIG. 1 comprises an unlocking object 101, an electronic device 102, and an intelligent door lock 103. The intelligent door lock 103 may be a smart door lock or any lock that is configured to receive wireless signals (e.g., Bluetooth signals).

The electronic device 102 may be carried by the unlocking object 101 (e.g., a person), and the electronic device 102 can be a smartphone, a tablet, a smartwatch, etc. The electronic device 102 can emit a signal, which can be a Bluetooth signal (such as an iBeacon signal, etc.). The electronic device 102 may have turned on the Bluetooth mode and can send a Bluetooth signal to other devices through a corresponding Bluetooth channel.

As shown in the application scenario in FIG. 1, when the unlocking object 101 carrying the electronic device 102 enters the Bluetooth monitoring range (e.g., 10 meters) from outside the Bluetooth monitoring range of the intelligent door lock 103, the intelligent door lock 103 can detect the signal sent by the electronic device 102 and determine the identification information of the unlocking object 101 based on the signal. Then, the intelligent door lock 103 may perform facial recognition and unlocking action detection on the unlocking object 101 when the identification information is determined to be the target identification information. When the unlocking object 101 is determined to be the target object and there is an unlocking action, the intelligent door lock 103 may be unlocked.

The target object may be the object that has the right to perform the unlocking operation on the intelligent door lock, which can be the homeowner, family members, robots, etc. The specific unlocking methods can include but are not limited to: fingerprint recognition unlocking, facial recognition unlocking, password unlocking, etc. It should be noted that when the identification information is determined to be non-target identification information, and/or the unlocking object is determined to be a non-target object, and/or there is no unlocking action, the intelligent door lock 103 may return to the initial state after a preset time (e.g., 3 seconds), so that the intelligent door lock 103 can perform identity verification again when a new signal is detected within the Bluetooth monitoring range. This setting can avoid the situation where the intelligent door lock cannot perform identity verification on the new unlocking object carrying an electronic device when it enters the Bluetooth monitoring range.

FIG. 2 shows a flowchart of an example of the intelligent door lock control method. As shown in FIG. 2, the process may include the following steps:

Step 201: When a target signal is detected (e.g., by a door lock), the identification information of the unlocking object may be obtained (determined) from the target signal.

The unlocking object can carry an electronic device and walk into the Bluetooth monitoring range from outside a preset range. The electronic device can send a signal to the outside (e.g., other wireless devices) in real-time. An intelligent door lock can detect the signal sent by the electronic device within the Bluetooth monitoring range and determine that the signal is the target signal. The intelligent door lock can be the intelligent door lock 103 shown in the application scenario in FIG. 1. The Bluetooth monitoring range may be the range in which the intelligent door lock can detect the signal sent by the electronic device. The specific Bluetooth monitoring range can be set by the designer or user, and the present invention does not limit this.

Furthermore, the target signal sent by the electronic device may comprise the identification information of the unlocking object. Therefore, when the target signal is detected, the target signal can be parsed to obtain the identification information of the unlocking object carried in the target signal. In this way, the identity of the unlocking object can be preliminarily verified according to the identification information. The above-mentioned identification information can comprise the ID information of the unlocking object, the name of the unlocking object, email, etc.

It should be noted that the executing subject of one or more steps described herein can be an electronic device (such as a server, terminal device, etc.), or a smart lock, and this application does not limit this.

Step 202, based on determining that the identification information is the target identification information, obtain a first image of the unlocking object.

Step 203, determine whether the unlocking object is the target object based on the first image.

Steps 202 and 203 may be described together as follows:

As can be seen from the description of step 201, after obtaining the identification information of the unlocking object, the identity of the unlocking object can be preliminarily verified according to the identification information. For example, the intelligent door lock and/or the electronic device may be configured to determine whether the identification information is the target identification information to determine the identity of the unlocking object. Based on determining that the identification information is the target identification information, the intelligent door lock and/or the electronic device may obtain a first image of the unlocking object.

In an example, the unlocking object can be imaged by the first image acquisition module to obtain the image of the unlocking object (hereinafter referred to as the first image). The first image acquisition module can be an independent image acquisition device, which can be an independent camera, video camera, etc. The first image acquisition module may be alternatively set on or included in the intelligent door lock, such as a camera set in the smart lock or doorbell, and this application does not limit this.

It should be noted that the image acquisition range of the first image acquisition module may be smaller than the above-mentioned Bluetooth detection range. For example, the above-mentioned Bluetooth detection range may be 10 meters, and the above-mentioned image acquisition range can be 1 meter. Through this setting, the first image of the unlocking object can be clearly obtained.

Furthermore, the intelligent door lock and/or the electronic device may determine whether the unlocking object is the target object based on the first image. For specific implementation on how to determine whether the unlocking object is the target object based on the first image, please refer to the detailed description of the process shown in FIG. 3.

Through this processing method, the identity of the unlocking object can be further verified, improving the security of unlocking the intelligent door lock. And in special cases, for example, when the electronic device of the target object is used (e.g., picked up, stolen) by others, dangerous situations can be avoided.

Step 204, based on determining that the unlocking object is the target object, the intelligent door lock and/or the electronic device may control the intelligent door lock based on whether the unlocking object has an unlocking action.

After determining that the unlocking object is the target object based on the first image, there are some special circumstances that may not warrant unlocking the lock. For example, the unlocking object may just pass through the Bluetooth detection range of the intelligent door lock and may have no intention to unlock the intelligent door lock. As another example, the unlocking object may be too far away from the intelligent door lock. Therefore, the intelligent door lock and/or the electronic device may be further configured to determine whether the unlocking object has an unlocking action, and control the intelligent door lock based on whether the unlocking object has an unlocking action.

For specific implementation on how to control the smart lock based on whether the unlocking object has an unlocking action, please refer to the detailed description of the process shown in FIG. 3.

The technical solution described herein comprise parsing the identification information of the unlocking object from the target signal when the target signal is detected; obtaining the first image of the unlocking object based on determining that the identification information is the target identification information; determining whether the unlocking object is the target object based on the first image; based on determining that the unlocking object is the target object, controlling the intelligent door lock based on whether the unlocking object has an unlocking action. In this process, by verifying the identification information, the first image, and the unlocking action of the unlocking object, the safety of unlocking can be improved, and dangerous situations can be avoided when the electronic device is, for example, picked up by others. After the unlocking object passes the verification of the identification information, the first image, and the unlocking action, the intelligent door lock can be unlocked, realizing seamless identity verification, without the need for the unlocking object to actively cooperate with the smart lock for identity verification. This also simplifies the unlocking operation, and enhances the object experience.

FIG. 3 shows a flow chart of a control method for an intelligent door lock. FIG. 3 specifically describes how to control the intelligent door lock. As shown in FIG. 3, the process can include the following steps:

Step 301, based on detecting the target signal, the intelligent door lock and/or the electronic device may be configured to parse the identification information of the unlocking object from the target signal.

The detailed description of step 301 can refer to the related description of step 201 in FIG. 2, which will not be repeated here.

Step 302, the intelligent door lock and/or the electronic device may be configured to receive the target identification information provided (e.g., entered) by the target object, and obtain the target identification information set.

Step 303, the intelligent door lock and/or the electronic device may determine whether the identification information matches with a target identification information set.

Step 304, based on determining the identification information matches the target identification information set, the intelligent door lock and/or the electronic device may determine that the identification information is the target identification information.

Further details of Steps 302 to 304 are described together as follows:

The above-mentioned target identification information may comprise the identification information entered by the target object, which can comprise object ID information, object name, etc., and this application does not limit this.

The target object can enter the corresponding target identification information into the intelligent door lock or electronic device (such as a server, terminal device, etc.), and the intelligent door lock or electronic device can receive the target identification information entered by the target object, which may be included in a target identification information set. The target identification information set may comprise at least one target identification information.

In an example, after including the target identification information in the target identification information set, the target identification information set can be stored in a preset storage medium for matching each target identification information in the target identification information set with the identification information of the unlocking object. The above-mentioned storage medium can be a database, such as the base library in the embedded control end; it can also be the cloud, and this application does not limit this.

Furthermore, the identification information of the unlocking object can be matched with each target identification information in the target identification information set to determine whether there is a target identification information in the target identification information set that matches the identification information of the unlocking object. Through this processing, the identity of the unlocking object can be preliminarily verified according to the identification information of the unlocking object, ensuring the safety of unlocking, and simplifying the unlocking operation without the user actively executing the unlocking operation.

In an example, after receiving the identification information of the unlocking object, the identification information can be sent to a preset application program of the executing subject. The application program may be configured to receive the identification information of the unlocking object and determine whether the identification information is the target identification information by matching the identification information with the stored target identification information set.

The above-mentioned application program can be an embedded application program, which can be deployed in the embedded control end in the intelligent door lock or doorbell, generally on the main control chip of the doorbell or intelligent door lock.

Specifically, when the identification information matches the information in the target identification information set, the intelligent door lock and/or the electronic device may determine that the identification information of the unlocking object is the target identification information; on the contrary, when the identification information does not match the information in the target identification information set, the intelligent door lock and/or the electronic device may determine that the identification information of the unlocking object is not the target identification information, and the intelligent door lock is controlled to remain locked.

Step 305, the intelligent door lock and/or the electronic device may obtain the first image of the unlocking object.

Step 306, the intelligent door lock and/or the electronic device may input the first image into a pre-trained feature extraction model to obtain the feature information of the unlocking object contained in the first image output by the feature extraction model.

Step 307, for each target feature information of the image of the target object in the preset image feature library, the intelligent door lock and/or the electronic device may compare the feature information of the unlocking object with the target feature information of the target object to obtain the similarity between the unlocking object and the target object.

Further details of Steps 305 to 307 are described together as follows:

The above-mentioned feature information may comprise the information of the feature points characterizing the unlocking object, such as eyes, nose, mouth, etc. The smart lock can identify the unlocking object based on the feature information.

The target object can obtain an image through an electronic device, and input the image of the target object into a pre-trained feature extraction model to obtain the target feature information of the image of the target object output by the feature extraction model, and save the target feature information to a preset image feature library. The above-mentioned electronic device can be a smart phone, tablet, camera, smart lock, etc., and this application does not limit this.

Based on determining that the identification information of the unlocking object is the target identification information, the first image of the unlocking object can be obtained through the above-mentioned image acquisition module to determine whether the unlocking object is the target object based on the first image.

In one example, in order to accurately determine whether the unlocking object is the target object, the above-mentioned first image can be the facial image of the unlocking object. Correspondingly, the above-mentioned image acquisition module can be a camera set in the front of the intelligent door lock or doorbell, which can accurately capture the facial image of the unlocking object.

In an example, the first image can be input into a pre-trained feature extraction model to obtain the feature information of the unlocking object contained in the first image output by the feature extraction model, and then for each target feature information of the image of the target object in the preset image feature library, the feature information of the unlocking object can be compared with the target feature information of the target object to obtain the similarity between the unlocking object and the target object. The similarity can be used to determine whether the unlocking object is the target object.

The above-mentioned similarity may be the similarity between the feature information of the unlocking object and the target feature information of the target object, and this application does not limit this.

For example, assuming that the feature information of the unlocking object includes A1, A2, A3, A4, A5, and the target feature information of the target object is A1, A2, A3, B1, B2. Then, by comparing the feature information of the unlocking object with the target feature information of the target object, the similarity between the unlocking object and the target object can be obtained as 60%.

In addition, other feature extraction algorithms can also be used to extract features from the first image of the unlocking object to obtain the feature information of the unlocking object contained in the first image, and this application does not limit this. Through this processing method, face recognition can be performed on the unlocking object to determine the identity of the unlocking object, and further verify the identity of the unlocking object.

Step 308, the intelligent door lock and/or the electronic device may compare the similarity with the preset similarity threshold, when the similarity is less than the similarity threshold, step 309 may be performed; when the similarity is greater than or equal to the similarity threshold, step 310 may be performed.

Step 309, the intelligent door lock and/or the electronic device may determine that the unlocking object is not the target object, and end the process.

Step 310, the intelligent door lock and/or the electronic device may determine that the unlocking object is the target object.

Further details in Steps 308 to 310 are described together as follows:

The above-mentioned similarity threshold may be used to compare with the similarity between the unlocking object and the target object to determine the identity of the unlocking object. It can be a positive value, such as 70%, 90%, etc., which can be set by the designer or user according to the specific situation, and this application does not limit this.

As can be seen from the above description, after obtaining the similarity between the unlocking object and the target object, the similarity can be compared with the preset similarity threshold to determine whether the unlocking object is the target object. Specifically, when the similarity is less than the similarity threshold, it can be determined that the unlocking object is not the target object; when the similarity is greater than or equal to the similarity threshold, it can be determined that the unlocking object is the target object. For example, if the similarity between the unlocking object and the target object is 50%, and the preset similarity threshold is 80%. Then, according to the above description, it can be determined that the similarity between the unlocking object and the target object is less than the similarity threshold, and it can be determined that the unlocking object is not the target object. As another example, if the similarity between the unlocking object and the target object is 100%, and the preset similarity threshold is 80%. Then, according to the above description, it can be determined that the similarity between the unlocking object and the target object is greater than the similarity threshold, and it can be determined that the unlocking object is the target object, and the next step may be performed.

If it is determined that the unlocking object is not the target object, the smart door lock can be immediately controlled to remain locked, and the initial state is restored, so that the next unlocking object can perform identity verification.

If it is determined that the unlocking object is not the target object, in order to avoid the situation where there is a calculation error and the verification result of the unlocking object is wrong, the first image of the unlocking object can be obtained within a preset number of times (for example, 2 times, 3 times, etc.) or a preset time (for example, 8 seconds, 10 seconds, etc.), and the step of determining whether the unlocking object is the target object can be based on the first image. Through this processing, the unlocking object can be given the opportunity to try and error, and at the same time, the situation where there is a calculation error and the verification result of the unlocking object is wrong can be avoided. It should be noted that the above-mentioned preset number of times or preset time is sufficient to verify the identity of the unlocking object, and will not affect the next unlocking object to perform identity verification. The specific number of times or time can be set by the designer or user, and this application does not limit this.

For example, assuming that the similarity between the unlocking object and the target object is 50%, and the preset similarity threshold is 80%. Then, according to the above description, it can be determined that the similarity between the unlocking object and the target object is less than the similarity threshold, and it can be determined that the unlocking object is not the target object, and the intelligent door lock can be immediately controlled to remain locked and return to the initial state.

If the similarity between the unlocking object and the target object is 50%, and the preset similarity threshold is 80%. Then, according to the above description, it can be determined that the similarity between the unlocking object and the target object is less than the similarity threshold, and it can be determined that the unlocking object is not the target object, and the step of obtaining the first image of the unlocking object and determining whether the unlocking object is the target object based on the first image can be executed again. If it is determined that the similarity between the unlocking object and the target object is 80%, it can be determined that the similarity between the unlocking object and the target object is equal to the similarity threshold, and it can be determined that the unlocking object is the target object, and the next step can be executed.

Step 311: the intelligent door lock and/or the electronic device may obtain the second image within the preset range of the smart door lock.

Step 312: the intelligent door lock and/or the electronic device may determine whether there is an unlocking action by the unlocking object based on the second image.

Step 313: the intelligent door lock and/or the electronic device may control the intelligent door lock to unlock when it is determined that there is an unlocking action by the unlocking object.

Step 314: the intelligent door lock and/or the electronic device may control the intelligent door lock to remain locked based on a determination that there is no unlocking action by the unlocking object.

The following is a unified description of steps 311 to 314:

In one example, a preset second image acquisition module can be used to obtain an image (hereinafter referred to as the second image) within the preset range outside the intelligent door lock, in order to determine whether there is an unlocking action by the unlocking object based on the second image.

The aforementioned second image acquisition module can be the same as or different from the first image acquisition module. It can be an independent image acquisition device, such as an independent camera, or it can be the first image acquisition module set on the intelligent door lock, such as a camera set in the intelligent door lock or doorbell, this application does not limit this.

When the second image acquisition module is different from the first image acquisition module, the first image acquisition module can be a camera located in front of the intelligent door lock or doorbell, used to obtain the first image of the unlocking object, and the second image acquisition module can be a camera (e.g., a different camera) in other positions (for example, diagonally below) of the smart door lock or doorbell, used to obtain the second image within the preset range of the smart door lock.

Specifically, based on a determination that there is an unlocking action by the unlocking object, the intelligent door lock is unlocked; on the contrary, based on a determination that that there is no unlocking action by the unlocking object, the intelligent door lock is controlled to remain locked.

The specific implementation of determining whether there is an unlocking action by the unlocking object based on the second image may comprise: inputting the second image into a pre-trained image recognition model to obtain the recognition result of the second image output by the image recognition model; when the recognition result indicates that there is an unlocking object in the second image, it is determined that there is an unlocking action by the unlocking object; when the recognition result indicates that there is no unlocking object in the second image, it is determined that there is no unlocking action by the unlocking object.

The aforementioned image recognition model can be an independent image recognition device, or it can be an image recognition module set in the second image acquisition module, such as a humanoid detection module, etc. This humanoid detection module is a targeted model trained for the lower half of the object, capable of humanoid detection, and is based on the open source algorithm YOLOv5, mainly training the feature information of the object's torso.

A humanoid detection module set in the second image acquisition module can be used to detect whether there is a humanoid within the preset range outside the smart door lock, in order to determine whether there is an unlocking action by the unlocking object. Specifically, when there is a humanoid, it may be determined that there is an unlocking action by the unlocking object; when there is no humanoid, it can be determined that there is no unlocking action by the unlocking object. When the recognition result indicates that there is an unlocking object in the second image, it can be determined that there is an unlocking action by the unlocking object; when the recognition result indicates that there is no unlocking object in the second image, it can be determined that there is no unlocking action by the unlocking object.

It should be noted that the aforementioned preset range may be smaller than the aforementioned image acquisition range, and the preset range may be large enough to verify whether there is an unlocking action by the unlocking object, for example, 0.5 meters. The application does not limit this. The above is just an example of determining whether there is an unlocking action by the unlocking object, in practice, other methods can also be used for determination, and this application does not limit this.

The second image acquisition module can be used to acquire the image of the area outside the door where the intelligent door lock is located, input the image of the area outside the door into the image recognition model, and determine whether there are legs or feet of the unlocking object in the image of the area outside the door through the image recognition model. When it is determined that there are legs or feet of the unlocking object in the image of the area outside the door, it can be determined that there is an unlocking action by the unlocking object; on the contrary, when it is determined that there are no legs or feet of the unlocking object in the image of the area outside the door, it can be determined that there is no unlocking action by the unlocking object.

The image of the area outside the door can also be input into the image recognition model, and the distance between the legs or feet of the unlocking object and the door in the image of the area outside the door can be determined through the image recognition model. The distance between the legs or feet of the unlocking object and the door is compared with a preset first distance threshold. When the distance between the legs or feet of the unlocking object and the door is less than or equal to the preset first distance threshold, it can be determined that there is an unlocking action by the unlocking object; on the contrary, when the distance between the legs or feet of the unlocking object and the door is greater than the preset first distance threshold, it can be determined that there is no unlocking action by the unlocking object.

For example, if the image of the area outside the door is input into the image recognition model, and the image recognition model may determine that the distance between the legs or feet of the unlocking object and the door in the image of the area outside the door is 3 cm, and the preset first distance threshold is 5 cm. Then, by comparing the distance between the legs or feet of the unlocking object and the door with the preset first distance threshold, it can be determined that the distance between the legs or feet of the unlocking object and the door is less than the preset first distance threshold.

The second image acquisition module can be used to acquire the image of the door handle at the location of the door where the intelligent door lock is located, input the door handle image into the image recognition model, and determine whether there are hands of the unlocking object in the door handle image through the image recognition model. When it is determined that there are hands of the unlocking object in the door handle image, it is determined that there is an unlocking action by the unlocking object; when it is determined that there are no hands of the unlocking object in the door handle image, it can be determined that there is no unlocking action by the unlocking object.

The door handle image can also be input into the image recognition model, and the recognition degree of the hands of the unlocking object in the door handle image can be determined through the image recognition model. The recognition degree can be compared with a preset recognition degree threshold; when the recognition degree is greater than or equal to the preset recognition degree threshold, it can be determined that there is an unlocking action by the unlocking object; on the contrary, when the recognition degree is less than the preset recognition degree threshold, it can be determined that there is no unlocking action by the unlocking object.

For example, if the image recognition model recognizes the input door handle image and obtains a recognition degree of 70% for the hands of the unlocking object in the door handle image output by the image recognition model, and the preset recognition degree threshold is 50%. Then, by comparing the recognition degree with the preset recognition degree threshold, it can be determined that the recognition degree is greater than the preset recognition degree threshold, it is determined that there is an unlocking object in the door handle image, and then it is determined that there is an unlocking action by the unlocking object.

The door handle image can also be input into the image recognition model, and the distance between the hands of the unlocking object and the door handle in the door handle image can be determined through the image recognition model. The distance between the hands of the unlocking object and the door handle is compared with a preset distance threshold. When the distance between the hands of the unlocking object and the door handle is less than or equal to the preset distance threshold, it can be determined that there is an unlocking object in the door handle image; on the contrary, when the distance between the hands of the unlocking object and the door handle is greater than the preset distance threshold, it can be determined that there is no unlocking object in the door handle image.

For example, if the image recognition model recognizes the input door handle image and obtains a distance of 9 cm between the hands of the unlocking object and the door handle in the door handle image output by the image recognition model, and the preset distance threshold is 5 cm. Then, by comparing the distance between the hands of the unlocking object and the door handle with the preset distance threshold, it can be determined that the distance between the hands of the unlocking object and the door handle is greater than the preset distance threshold, it is determined that there is no unlocking object in the door handle image, and then it is determined that there is an unlocking action by the unlocking object.

In addition, after it is determined that there is no unlocking object in the second image based on the recognition result, and it is determined that there is no unlocking action by the unlocking object, the intelligent door lock can be immediately controlled to remain locked, and the initial state can be restored, in order to allow the next unlocking object to perform identity verification.

After it is determined that there is no unlocking object in the second image based on the recognition result, and it is determined that there is no unlocking action by the unlocking object, in order to avoid the situation where the unlocking object cannot unlock due to being delayed and not entering the preset range outside the smart door lock, the steps of obtaining the second image within the preset range of the smart door lock, determining whether there is an unlocking action by the unlocking object based on the second image, and controlling the smart door lock based on whether there is an unlocking action by the unlocking object can be performed within a preset number of times (for example, 2 times, 3 times, etc.) or a preset time (for example, 8 seconds, 10 seconds, etc.). Through this processing, the unlocking object can be given the opportunity to try and error, and at the same time, the situation where the smart door lock cannot be unlocked under special circumstances can be avoided.

Through this processing method, the identity of the unlocking object can be verified from three aspects: identification information, the first image, and unlocking action, which can improve the security of unlocking; and it can realize the imperceptible identity verification of the unlocking object, without the need for the unlocking object to actively cooperate with the smart door lock for identity verification, simplifying the unlocking operation and enhancing the user experience.

Refer to FIG. 4, which is a flowchart of an example a control method for an intelligent door lock. Based on FIG. 2, FIG. 4 specifically describes how to determine the entry status of the unlocking object. As shown in FIG. 4, the process can comprise the following steps:

Step 401: When a target signal is detected, the identification information of the unlocking object is parsed from the target signal.

Step 402: When it is determined that the identification information is the target identification, the first image of the unlocking object is obtained.

For detailed descriptions of steps 401 and 402, please refer to the relevant descriptions of steps 201 and 202 in FIG. 2, which are not repeated here.

Step 403: Determine a change in signal strength of the target signal within the preset detection period.

Step 404: Determine whether the unlocking object is currently outside.

Step 405: When it is determined that the unlocking object is currently outside and the signal strength changes from weak to strong (e.g., an increase in signal strength), it can be determined that the unlocking object is in the entry state, and step 406 is performed.

The following is a unified description of steps 403 to 405:

The aforementioned signal strength may be the strength of the signal emitted by the electronic device carried by the unlocking object detected by the intelligent door lock. In practice, as the unlocking object carrying the electronic device approaches the smart door lock, the signal strength may change from weak to strong; on the contrary, as the unlocking object carrying the electronic device leaves the intelligent door lock, the signal strength may change from strong to weak. In this way, the entry or exit status of the unlocking object can be determined through the signal emitted by the electronic device carried by the unlocking object.

Furthermore, it can be determined whether the unlocking object is currently outside, in order to further distinguish between the entry and exit status of the unlocking object. Specifically, when it is determined that the unlocking object is currently outside and the signal strength changes from weak to strong, it may be determined that the unlocking object is in the entry state, and step 406 is performed; when it is determined that the unlocking object is currently outside and the signal strength changes from strong to weak, it may be determined that the unlocking object is in the exit state.

Furthermore, when it is determined that the unlocking object is in the exit state, it can be detected whether the intelligent door lock is locked. If it is detected that the smart door lock is not locked, the intelligent door lock can be controlled to lock. Through this setting, the intelligent door lock can be further ensured to be locked, improving safety, avoiding dangers, and enhancing the user experience.

The first image acquisition module can be used to acquire the image within the image acquisition area outside the door of the intelligent door lock, and it can be determined whether there is an unlocking object outside the door of the smart door lock based on this image. If it is determined that there is an unlocking object outside the door of the smart door lock based on this image, it can be determined that the unlocking object is currently outside; if it is determined that there is no unlocking object outside the door of the smart door lock based on this image, it can be determined that the unlocking object is currently inside.

It should be noted that the above is just an example of determining whether the unlocking object is currently outside. In practice, other methods (such as sensors, cameras, etc.) can also be used for determination, and this application does not limit this.

In addition or alternatively, if the Bluetooth detection range of the intelligent door lock can cover the inside of the house, then when the target signal is detected, the unlocking object can be determined to be in the entry state; when the target signal is detected to leave the Bluetooth detection range, the unlocking object can be determined to be in the exit state.

The signal sequence within multiple signal acquisition periods can be obtained; the entry or exit status of the unlocking object can be determined based on the change of the target signal in the signal sequence. If the target signal in the signal sequence is not detected in the later acquisition time, it can be determined that the unlocking object is in the exit state.

Step 406: Determine whether the unlocking object is the target object based on the first image.

Step 407: When it is determined that the unlocking object is the target object, control the intelligent door lock based on whether there is an unlocking action by the unlocking object.

For detailed descriptions of steps 406 and 407, please refer to the relevant descriptions of steps 203 and 204 in FIG. 2, which are not repeated here.

The processing of the procedure shown in FIG. 4 can realize the detection of the unlocking object's entry or exit status, and further control the smart door lock. When the unlocking object is in the entry status, the control method of the smart door lock can be executed to realize the senseless identity verification, without the need for the unlocking object to actively cooperate with the smart door lock for identity verification, simplifying the unlocking operation. When the unlocking object is in the exit status, the smart door lock can be ensured to be locked, improving safety, avoiding the occurrence of dangers, and enhancing the object experience.

Figure 5:
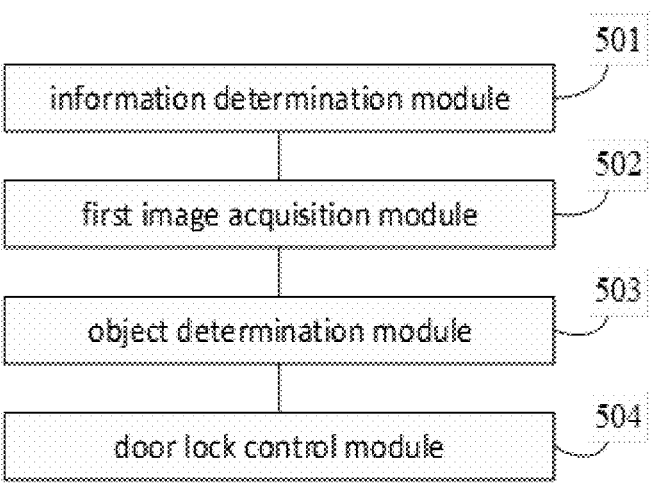
FIG. 5 shows a block diagram of an exemplary implementation of an intelligent door lock control device.

Corresponding to the control method of the intelligent door lock mentioned above, the present application also provides an example diagram of the device. Refer to FIG. 5, which is an example diagram of a control device of an intelligent door lock. As shown in FIG. 5, the device comprises:

An information determination module 501, for parsing the identification information of the unlocking object from the target signal when the target signal is detected;

A first image acquisition module 502, for obtaining the first image of the unlocking object when the identification information is determined to be the target identification information;

An object determination module 503, for determining whether the unlocking object is the target object based on the first image;

A door lock control module 504, for controlling the smart door lock based on whether the unlocking object exists unlocking action when the unlocking object is determined to be the target object.

In a possible implementation, the device also includes (not shown in the figure):

A set determination module, for receiving the target identification information entered by the target object, and obtaining a set of target identification information;

The first image acquisition module, specifically used for: matching the identification information with the target identification information set; and when the identification information is matched from the target identification information set, the identification information is determined to be the target identification information.

In a possible implementation, the object determination module includes (not shown in the figure):

An information determination unit, for inputting the first image into a pre-trained feature extraction model, and obtaining the feature information of the unlocking object contained in the first image output by the feature extraction model;

A similarity determination unit, for comparing the feature information of the unlocking object with the target feature information of the image of each target object in the preset image feature library, and obtaining the similarity between the unlocking object and the target object; and A target object determination unit, for determining whether the unlocking object is a target object based on the similarity.

In a possible implementation, the target object determination unit, specifically configured for:

Comparing the similarity with a preset similarity threshold;

When the similarity is greater than or equal to the similarity threshold, the unlocking object is determined to be the target object;

When the similarity is less than the similarity threshold, the unlocking object is determined to be a non-target object.

In a possible implementation, the door lock control module includes (not shown in the figure):

An image acquisition unit, for obtaining the second image within the preset range of the smart door lock; and A judgment unit, for determining whether the unlocking object exists unlocking action based on the second image; when it is determined that the unlocking object exists unlocking action, the smart door lock is unlocked; when it is determined that the unlocking object does not exist unlocking action, the smart door lock is controlled to remain locked.

In a possible implementation, the judgment unit, specifically configured for:

Inputting the second image into a pre-trained image recognition model, and obtaining the recognition result of the second image output by the image recognition model;

When the recognition result indicates that the unlocking object exists in the second image, it is determined that the unlocking object exists unlocking action;

When the recognition result indicates that the unlocking object does not exist in the second image, it is determined that the unlocking object does not exist unlocking action.

In a possible implementation, the device also includes (not shown in the figure):

A strength change determination module, for determining the signal strength change of the target signal within a preset detection period;

An outdoor determination module, for determining whether the unlocking object is currently outdoors; and A status determination module, for determining that the unlocking object is in the entry status when it is determined that the unlocking object is currently outdoors and the signal strength change is from weak to strong, and executing the step of determining whether the unlocking object is a target object.

Figure 6:
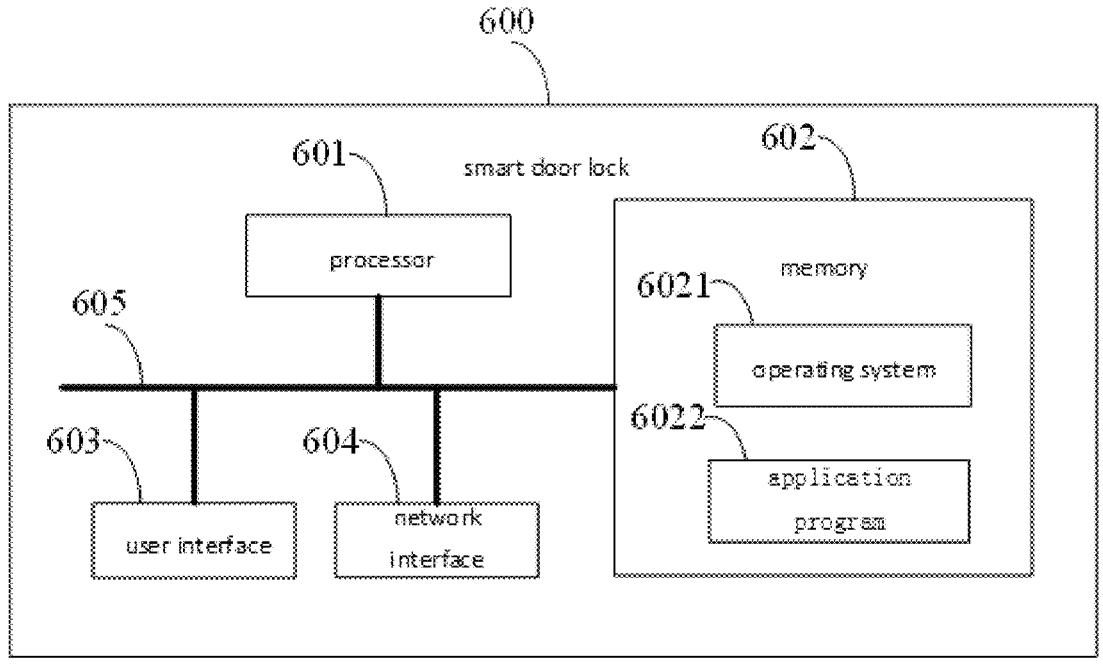
FIG. 6 shows a schematic diagram of the structure of an intelligent door lock.

FIG. 6 is a schematic diagram of the structure of a smart door lock. The intelligent door lock 600 shown in FIG. 6 includes: at least one processor 601, memory 602, at least one network interface 604 and user interface 603. The various components in the smart door lock 600 are coupled together through a bus system 605. It can be understood that the bus system 605 is used to implement the connection communication between these components. The bus system 605 includes not only a data bus, but also a power bus, a control bus, and a status signal bus. However, for the sake of clarity, all kinds of buses are marked as bus system 605 in FIG. 6.

The user interface 603 can include a display, a keyboard or a clicking device (for example, a mouse, a trackball), a touchpad or a touch screen, etc.

It can be understood that the memory 602 in the present application can be volatile memory or non-volatile memory, or can include both volatile and non-volatile memory. The non-volatile memory can be read-only memory (ROM), programmable ROM (PROM), erasable PROM (EPROM), electrically erasable PROM (EEPROM) or flash memory. Volatile memory can be random access memory (RAM), which is used as an external high-speed cache. By way of example but not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), and Direct Rambus RAM (DRRAM). The memory 602 described in this article is intended to include but is not limited to these and any other suitable types of memory.

In some implementations, the memory 602 stores the following elements, executable units or data structures, or their subsets, or their extended sets: 6021 and application 6022.

The operating system 6021 includes various system programs, such as the framework layer, core library layer, driver layer, etc., used to implement various basic services and handle hardware-based tasks. The application 6022 includes various applications, such as media player, browser, etc., used to implement various application services. The program to implement the methods of the present application can be included in the application 6022.

By calling the program or instruction stored in the memory 602, specifically, it can be the program or instruction stored in the application 6022, the processor 601 is used to execute the method steps, including:

When a target signal is detected, parse the identification information of the unlocking object from the target signal;

When the identification information is determined to be the target identification information, obtain the first image of the unlocking object;

Determine whether the unlocking object is a target object based on the first image;

When the unlocking object is determined to be the target object, control the intelligent door lock based on whether the unlocking object exists unlocking action.

The methods disclosed in the present application can be applied in the processor 601, or implemented by the processor 601. The processor 601 may be an integrated circuit chip with signal processing capability. In the implementation process, the steps of the above method can be completed by the integrated logic circuit of the hardware in the processor 601 or the instruction in the form of software. The above-mentioned processor 601 can be a general processor, digital signal processor (DSP), application-specific integrated circuit (ASIC), field-programmable gate array (FPGA) or other programmable logic device, discrete gate or transistor logic device, discrete hardware component. The disclosed methods, steps, and logic diagrams in the present application can be implemented or executed. The general processor can be a microprocessor, or the processor can also be any conventional processor, etc. The steps of the method disclosed in the present application can be directly reflected as completed by the hardware decoding processor, or completed by the combination of the hardware and software units in the decoding processor. The software unit can be located in a random memory, flash memory, read-only memory, programmable read-only memory or electrically erasable programmable memory, registers and other mature storage media in the field. This storage medium is located in the memory 602, and the processor 601 reads the information in the memory 602, and completes the steps of the above method in conjunction with its hardware.

It can be understood that the examples described in this article can be implemented with hardware, software, firmware, middleware, microcode, or a combination thereof. For hardware implementation, the processing unit can be implemented in one or more application-specific integrated circuits (ASICs), digital signal processors (DSPs), digital signal processing devices (DSPDs), programmable logic devices (PLDs), field-programmable gate arrays (FPGAs), general processors, controllers, microcontrollers, microprocessors, other electronic units for executing the functions described in this application, or a combination thereof.

For software implementation, the techniques described in this article can be implemented through units that execute the functions described herein. Software code can be stored in memory and executed by a processor. The memory can be implemented inside or outside the processor.

The intelligent door lock be the intelligent door lock shown in FIG. 6, which can execute all the steps of the control method of the smart door lock in FIGS. 2-4, thereby achieving the technical effects of the control method of the smart door lock in FIGS. 2-4. Please refer to the related description of FIGS. 2-4 for specifics. For the sake of brevity, it will not be repeated here.

The present application also provides a storage medium (e.g., non-transitory computer-readable storage medium). The storage medium here stores one or more programs. The storage medium can include volatile memory, such as random access memory; the memory can also include non-volatile memory, such as read-only memory, flash memory, hard disk or solid-state hard disk; the memory can also include a combination of the above types of memory.

When one or more programs in the storage medium can be executed by one or more processors, the control method of the smart door lock executed on the smart door lock side can be implemented.

The processor is used to execute the control program of the smart door lock stored in the memory, to implement the following steps of the control method of the smart door lock executed on the smart door lock side:

When a target signal is detected, parse the identification information of the unlocking object from the target signal;

When the identification information is determined to be the target identification information, obtain the first image of the unlocking object;

Determine whether the unlocking object is a target object based on the first image;

When the unlocking object is determined to be the target object, control the smart door lock based on whether the unlocking object exists unlocking action.

A person of ordinary skill in the art should also be able to further realize that the units and algorithm steps of each example described herein can be implemented with electronic hardware, computer software, or a combination of the two. In order to clearly illustrate the interchangeability of hardware and software, the components and steps of each example have been generally described according to function in the above description. Whether these functions are executed in hardware or software depends on the specific application and design constraints of the technical solution. A person of ordinary skill in the art can use different methods to implement the described functions for each specific application, but such implementation should not be considered beyond the scope of this application.

The steps of the methods or algorithms described herein can be implemented with hardware, software modules executed by a processor, or a combination of the two. Software modules can be placed in random access memory (RAM), memory, read-only memory (ROM), electrically programmable ROM, electrically erasable programmable ROM, registers, hard drives, removable disks, CD-ROMs, or any other form of storage medium known in the art.

The above-described specific examples have further detailed the purpose, technical solution, and beneficial effects of the present application. It should be understood that the above description is only for the specific examples of the present application and is not intended to limit the scope of the present application. Any modifications, equivalent replacements, and improvements made within the spirit and principles of the present application should be included within the scope of protection of the present application.

What is claimed is:

1. A control method for an intelligent door lock, comprising:

detecting, by a computing device, a target signal associated with a user;

parsing identification information of the user from the target signal;

based on determining that the identification information is target identification information, obtaining a first image of the user;

determining whether the user is a target user based on the first image;

obtaining a second image within a range of the intelligent door lock;

determining, based on inputting the second image to an image recognition model, a distance between a hand of the user and a door handle associated with the intelligent door lock;

determining, based on a comparison between the distance and a threshold, whether the user has an unlocking action; and based on determining that the user is the target user and based on determining that the user has the unlocking action, controlling the intelligent door lock to unlock.

2. The method according to claim 1, further comprising:

receiving the target identification information provided by the target user;

matching the identification information with the target identification information; and based on that the identification information is matched with the target identification information, determining the identification information as the target identification information.

3. The method according to claim 1, wherein the determining whether the user is the target user based on the first image comprises:

inputting the first image into a pre-trained feature extraction model to obtain feature information of the user;

comparing the feature information of the user with target feature information of the target user to obtain a similarity between the user and the target user; and determining whether the user is the target user based on the similarity.

4. The method according to claim 3, wherein the determining whether the user is the target user based on the similarity comprises:

comparing the similarity with a preset similarity threshold; and based on a determination that the similarity is greater than or equal to the preset similarity threshold, determining the user as the target user.

5. The method according to claim 1, further comprising:
determining a change in signal strength of the target signal within a preset detection period;
determining whether the user is currently outside of the intelligent door lock; and
based on a determination that the user is currently outside of the intelligent door lock and an increase in the signal strength, determining that the user is in an entering state.

6. The control method according to claim 1, wherein the determining, based on the second image, whether the user has the unlocking action comprises determining, based on a position of a hand relative to the door handle, that the user has the unlocking action.

7. An intelligent door lock comprising:
one or more processors; and
memory storing instructions that, when executed by the one or more processors, cause the intelligent door lock to:
detect a target signal associated with a user;
parse identification information of the user from the target signal;
based on determining that the identification information is target identification information, obtain a first image of the user;
determine whether the user is a target user based on the first image;
obtain a second image within a range of the intelligent door lock;
determine, based on inputting the second image to an image recognition model, a distance between a hand of the user and a door handle associated with the intelligent door lock;
determine, based on a comparison between the distance and a threshold, whether the user has an unlocking action; and
based on determining that the user is the target user and based on determining that the user has the unlocking action, unlocking the intelligent door lock.

8. The intelligent door lock of claim 7, wherein the instructions, when executed by the one or more processors, cause the intelligent door lock to:
receive the target identification information provided by the target user;
match the identification information with the target identification information; and
based on that the identification information is matched with the target identification information, determine the identification information as the target identification information.

9. The intelligent door lock of claim 7, wherein the instructions, when executed by the one or more processors, cause the intelligent door lock to determine whether the user is the target user based on the first image by:
inputting the first image into a pre-trained feature extraction model to obtain feature information of the user;
comparing the feature information of the user with target feature information of the target user to obtain a similarity between the user and the target user; and
determining whether the user is the target user based on the similarity.

10. The intelligent door lock of claim 9, wherein the instructions, when executed by the one or more processors, cause the intelligent door lock to determine whether the user is the target user based on the similarity by:
comparing the similarity with a preset similarity threshold; and
based on a determination that the similarity is greater than or equal to the preset similarity threshold, determining the user as the target user.

11. The intelligent door lock of claim 7, wherein the instructions, when executed by the one or more processors, cause the intelligent door lock to:
determine a change in signal strength of the target signal within a preset detection period;
determine whether the user is currently outside of the intelligent door lock; and
based on a determination that the user is currently outside of the intelligent door lock and an increase in the signal strength, determine that the user is in an entering state.

12. The intelligent door lock according to claim 7, wherein the instructions, when executed by the one or more processors, cause the intelligent door lock to determine, based on the second image, whether the user has the unlocking action by determining, based on a position of a hand relative to the door handle, that the user has the unlocking action.

13. A non-transitory computer-readable medium storing instructions that, when executed, cause:
detecting a target signal associated with a user;
parsing identification information of the user from the target signal;
based on determining that the identification information is target identification information, obtaining a first image of the user;
determining whether the user is a target user based on the first image;
obtaining a second image within a range of an intelligent door lock;
determining, based on inputting the second image to an image recognition model, a distance between a hand of the user and a door handle associated with the intelligent door lock;
determining, based on a comparison between the distance and a threshold, whether the user has an unlocking action; and
based on determining that the user is the target user and based on determining that the user has the unlocking action, controlling the intelligent door lock to unlock.

14. The non-transitory computer-readable medium of claim 13, wherein the instructions, when executed, cause:
receiving the target identification information provided by the target user;
matching the identification information with the target identification information; and
based on that the identification information is matched with the target identification information, determining the identification information as the target identification information.

15. The non-transitory computer-readable medium of claim 13, wherein the instructions, when executed, cause the determining whether the user is the target user based on the first image by causing:
inputting the first image into a pre-trained feature extraction model to obtain feature information of the user;
comparing the feature information of the user with target feature information of the target user to obtain a similarity between the user and the target user; and
determining whether the user is the target user based on the similarity.

16. The non-transitory computer-readable medium of claim 13, wherein the instructions, when executed, cause:

determining a change in signal strength of the target signal within a preset detection period;

determining whether the user is currently outside of the intelligent door lock; and based on a determination that the user is currently outside of the intelligent door lock and an increase in the signal strength, determining that the user is in an entering state.

17. The non-transitory computer-readable medium according to claim 13, wherein the instructions, when executed, cause determining, based on the second image, whether the user has the unlocking action by causing determining, based on a position of a hand relative to the door handle, that the user has the unlocking action.

\* \* \* \* \*